(12) United States Patent  (10) Patent No.: US 8,855,171 B2
Chu et al.  (45) Date of Patent: Oct. 7, 2014

(54) SATELLITE SIGNAL ACQUISITION

(75) Inventors: Chih-Yuan Chu, Hsinchu (TW); Hao Zhou, Mountain View, CA (US); Hao-Jen Cheng, Santa Clara, CA (US); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/207,293

(22) Filed: Aug. 10, 2011

(65) Prior Publication Data

US 2013/0039392 A1    Feb. 14, 2013

(51) Int. Cl.
*H04B 1/00* (2006.01)
*G01S 19/24* (2010.01)

(52) U.S. Cl.
CPC .................................... *G01S 19/246* (2013.01)
USPC ...... 375/149; 375/340; 375/346; 342/357.63; 342/357.69; 342/357.77

(58) Field of Classification Search
CPC ......... G01S 19/30; G01S 19/37; G01S 19/29; G01S 19/246; H04B 1/7077; H04B 1/708; H04B 1/70752; H04B 1/70751; H04B 10/152
USPC ............... 375/149, 340, 346, 357.77, 357.63, 375/357.69; 342/357.63, 357.69, 357.77
See application file for complete search history.

(56) References Cited

U.S. PATENT DOCUMENTS

| | | | | |
|---|---|---|---|---|
| 6,038,248 | A * | 3/2000 | Rabaeijs et al. | 375/130 |
| 7,479,924 | B2 * | 1/2009 | Jia et al. | 342/357.63 |
| 7,852,907 | B2 * | 12/2010 | Eerola | 375/150 |
| 7,903,600 | B2 * | 3/2011 | Yeh et al. | 370/320 |
| 8,044,853 | B2 * | 10/2011 | Zhao et al. | 342/357.63 |
| 8,081,922 | B2 | 12/2011 | Simic et al. | |
| 8,138,972 | B2 * | 3/2012 | Underbrink et al. | 342/357.63 |
| 8,184,676 | B2 * | 5/2012 | Lennen | 375/148 |
| 8,436,771 | B2 * | 5/2013 | Singh et al. | 342/357.63 |
| 2005/0141603 | A1 | 6/2005 | Miller | |
| 2007/0013583 | A1 * | 1/2007 | Wang et al. | 342/357.15 |
| 2007/0093961 | A1 | 4/2007 | Norman et al. | |
| 2009/0323780 | A1 * | 12/2009 | Lennen | 375/148 |

OTHER PUBLICATIONS

International Search Report and Written Opinion—PCT/US2011/050268—ISA/EPO—Jan. 12, 2012.

* cited by examiner

*Primary Examiner* — Sophia Vlahos
(74) *Attorney, Agent, or Firm* — Bever, Hoffman & Harms, LLP

(57) ABSTRACT

A technique for reducing the dwell time in acquiring a satellite signal is provided. The technique minimizes the dwell time in searching for a satellite signal in cells of a search space by comparing the peak-power-to-average ratio (PAPR) to one or more thresholds at one or more intermediate points during the search in a code phase/Doppler frequency bin. The comparison is then used to determine whether to continue the search in a current code phase/Doppler frequency bin or to continue to the next code phase/Doppler frequency bin.

16 Claims, 6 Drawing Sheets

SATELLITE SIGNAL ACQUISITION

BACKGROUND

Embodiments of the inventive subject matter generally relate to the field of satellite receiver systems, and, more particularly, to techniques for reducing the acquisition time in receiving a satellite signal.

Satellite navigation systems, such as the Global Positioning Satellite (GPS) system or the Global Navigation Satellite System (GLONASS), consist of multiple satellites. A satellite receiver may determine its position on earth using radio frequency signals transmitted along a line-of-sight from several of these satellites. Multiple satellites are often employed in order to improve the accuracy of the satellite receiver's position.

The satellite receiver must first acquire the satellite signals. Each satellite transmits a coarse acquisition code (C/A) made up of a long digital pattern referred to as a pseudorandom noise (PRN) code, in the case of GPS satellites, or a PN code, in the case of GLONASS satellites. When a satellite receiver is first turned on, it searches for satellite signals that match known C/A codes. A match of a known C/A and a Doppler frequency with a received satellite signal identifies the transmitting satellite. However, when multiple satellites are utilized and the length of the C/A is long, the dimensions of the search space increases the acquisition time spent in acquiring the signal. Fast signal acquisition plays an important role in achieving reliable satellite communications. With the increase in demand for satellite-based positioning, fast signal acquisition will be a limiting factor for achieving reliable communications and performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A technique for reducing the dwell time in acquiring a satellite signal is provided. An acquisition phase is used to acquire an incoming satellite signal which involves differentiating the incoming signal from other signals. During the acquisition phase, a satellite receiver determines the code phase and the Doppler frequency shift of the satellite that is transmitting data to the receiver. This involves a search over all possible Doppler frequencies and the code phases. For each code phase/Doppler frequency pair, a complex baseband version of the signal is cross-correlated with a code sequence. The correct alignment is identified by the measurement of the output power produced from the correlation. The correlation may include a combination of coherent and non-coherent integration techniques.

The dwell time ay be the product of the coherent integration time and the number of non-coherent integrations that are performed in the correlation. At certain intermediate points, checks are made to determine if the non-coherent integration should be continued or terminated. All the iterations of the non-coherent integration do not need to be performed when it is highly likely that a search in a particular code phase/Doppler frequency pair may match a particular code sequence, or it is highly likely that no match is possible. Two peak-to-average-power ratios (PAPR) thresholds are used to determine whether or not the non-coherent integration should be terminated at a particular intermediate point.

In one case, if the PAPR at an intermediate point in the non-coherent integration does not exceed a first PAPR threshold, then it is highly unlikely that the signal is present in the current search. The search is terminated in the current search bin and continues in the next search bin. In a second case, if the PAPR at an intermediate point in the non-coherent integration exceeds a second PAPR threshold, then it is highly likely that the signal is present in the current search bin. The search is terminated and signal verification is triggered. By detecting early in the integration process whether or not a search is likely to be successful or not, the dwell time is reduced thereby reducing the overall acquisition time in searching for a satellite signal.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
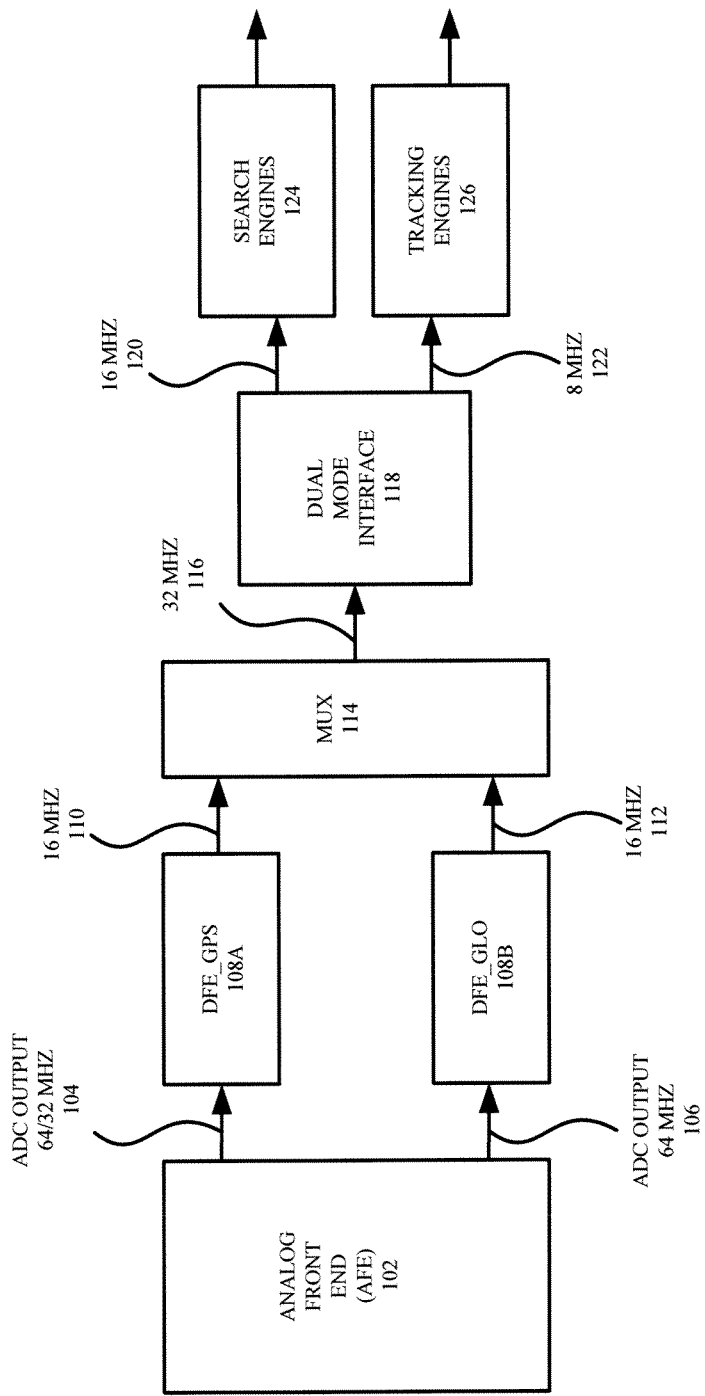
FIG. 1 is an exemplary block diagram of a satellite receiver.

Satellite receivers may utilize satellites from different satellite systems in order to determine a more reliable and accurate position. GPS is a satellite system developed and operated by the United States. GLONASS is a satellite system developed and operated by Russia. The acquisition of signals from either or both of these satellite systems relies on the fast and accurate performance of the acquisition technique that the search engine employs to acquire these signals.

GPS is a satellite navigation system funded by the U.S. Department of Defense. GPS uses between 24-32 satellites. Assuming the minimum number of 24 satellites, 4 satellites are deployed in each of six orbits. The six orbital planes' ascending nodes are separated by 60 degrees. In this configuration, a minimum of six satellites should be in view from any given point at any time.

All GPS satellites transmit at 1575 MHz, wherein a received signal may distinguish signals from different satellites because each signal is encoded with a high-rate PRN sequence of 1023 "chips" that are unique for each satellite. These chips are also called a Code Acquisition code (C/A) modulated on a L1 carrier phase. A C/A code is a repeating 1 MHz pseudo random noise (PRN) code that uniquely identifies a particular satellite and repeats every 1023 bits or 1 millisecond (1 ms).

GLONASS is a radio-based satellite system developed by the former Soviet Union and now operated by Russia. GLONASS includes 24 satellites, wherein 21 satellites may be used for transmitting signals and 3 satellites may be used as spares. The 24 satellites are deployed in three orbits, each orbit having 8 satellites. The three orbital planes' ascending nodes are separated by 120 degrees. In this configuration, a minimum of five satellites should be in view from any given point at any time.

All GLONASS satellites transmit the same standard precision signal but with each satellite transmitting on a different frequency between 1602-1616 MHz. Specifically, GLONASS uses a 15 channel FDMA (frequency division multiple access) centered on 1602.0 MHz. Therefore, each satellite transmits at 1602 MHz+(N×0.5625 MHz), wherein N is a frequency channel number (N=-7, -6, -5, . . . 5, 6).

The GLONASS signal has a simple structure. The signal is a sinusoidal carrier which has a phase shift of 0° or 180° every $(0.511$ MHz$)^{-1}$. Each phase shift represents a modulation symbol or chip. Each group of 511 chips represents a PN code. Each PN code is well known and is the same for each GLONASS satellite.

The GPS and GLONASS satellites differ in certain aspects. For instance, GPS and GLONASS satellites differ in the modulation scheme employed. GLONASS uses Frequency Division Multiple Access (FDMA) modulation to discriminate the signals of different satellites and GPS employs Code Division Multiple Access (CDMA). Additionally, the codes and chip rates differ. The PN code has a smaller code length (511 chips) than the PRN code used in GPS satellites (1023 chips). The PRN has a higher chip rate (1.023 MHz) than the PN chip rate used in GPS (0.511 MHz). All GPS satellites transmit on the same carrier frequency but with a different known PRN code. Each GLONASS satellite transmits on a different frequency but with the same PN code. Despite these differences, GPS and GLONASS receivers may perform two dimensional searches, in time and frequency, in a common manner in order to acquire a satellite signal.

A receiver having the capability to receive data from multiple satellites, such as GPS and GLONASS satellites combined, may dramatically improve the reliability and accuracy of the receiver's location. The accuracy of the location is dependent on the number of satellites tracked. However, the availability of the satellites is crucial to determining the positioning data. In certain geographic areas, the accessibility or line-of-sight of a visible satellite is blocked or distorted by buildings or terrain. With the use of a combined GPS and GLONASS receiver, the receiver increases the availability of the satellites used to determine the positioning data and thereby improve the accuracy of the its position.

FIG. 1 illustrates an exemplary receiver 100 for receiving and decoding signals for both GPS and GLONASS satellites. The receiver 100 includes an analog front end (AFE) 102 coupled to one or more antennas (not shown) that receive a RF signal. The AFE 102 is coupled to a digital front end for GPS (DFE_GPS) 108A and a DFE for GLONASS (DFE_GLO) 108B. The AFE 102 outputs an analog to digital converter (ADC) signal at 32 or 64 MHz for a received GPS signal 104, and outputs an ADC signal at 64 MHz for a received GLONASS signal 106. The DFE outputs of DFE_GPS 110 and DFE_GLO 112 are both sampled at 16 MHz. The DFE outputs 110, 112 are coupled to a multiplexor (MUX) 114 that may multiplex these outputs to 32 MHz to generate a single signal 116. A dual mode interface 118 may receive the output 116 of MUX 114 and generate signals for one or more search engines 124 (e.g., at 16 MHz) as well as for one or more tracking engines 126. The search engines 124 are used to acquire a satellite signal and the tracking engines are used to track each of the identified satellites to provide continuous real-time position determination. There may be multiple search engines 124 and each search engine may be dynamically configured to search for either a GPS satellite signal or a GLONASS satellite signal.

Although the system 100 shown in FIG. 1 has a limited number of elements in a certain configuration, it should be appreciated that the system 100 may include more or less elements in alternate configurations. A more detailed description of system 100 is provided in U.S. patent application Ser. No. 12/754,521, entitled "Analog Front End For System Simultaneously Receiving GPS And GLONASS Signals", filed on Apr. 5, 2010, and incorporated by reference herein.

A function of a satellite receiver is to reconstruct the carrier, extract the codes, and determine the navigation messages. An acquisition phase is used to acquire the incoming signal which involves differentiating the incoming signal from other signals, such as other satellite signals, noise, or interferences. During the acquisition phase, the satellite receiver determines the code offset or phase and the Doppler frequency shift of the satellite that is transmitting data to the receiver. The code phase is the relative position within the C/A code period. The Doppler frequency shift is the change in frequency attributable to satellite motion. This involves a search over all the possible Doppler frequencies and the code phases. For each Doppler/code phase pair, a complex baseband (zero-IF) version of the signal is cross-correlated with the code sequence (i.e. the PRN sequence or the PN sequence). The correct alignment is identified by the measurement of the output power of the correlators (i.e., similarity measurement). When both the code and the Doppler frequency of the local replica match the received signal, the signal may be verified and despread to recover the carrier signal. Information in the carrier signal is then used to initialize tracking engines that track variations in the carrier Doppler and code phase.

Figure 2:
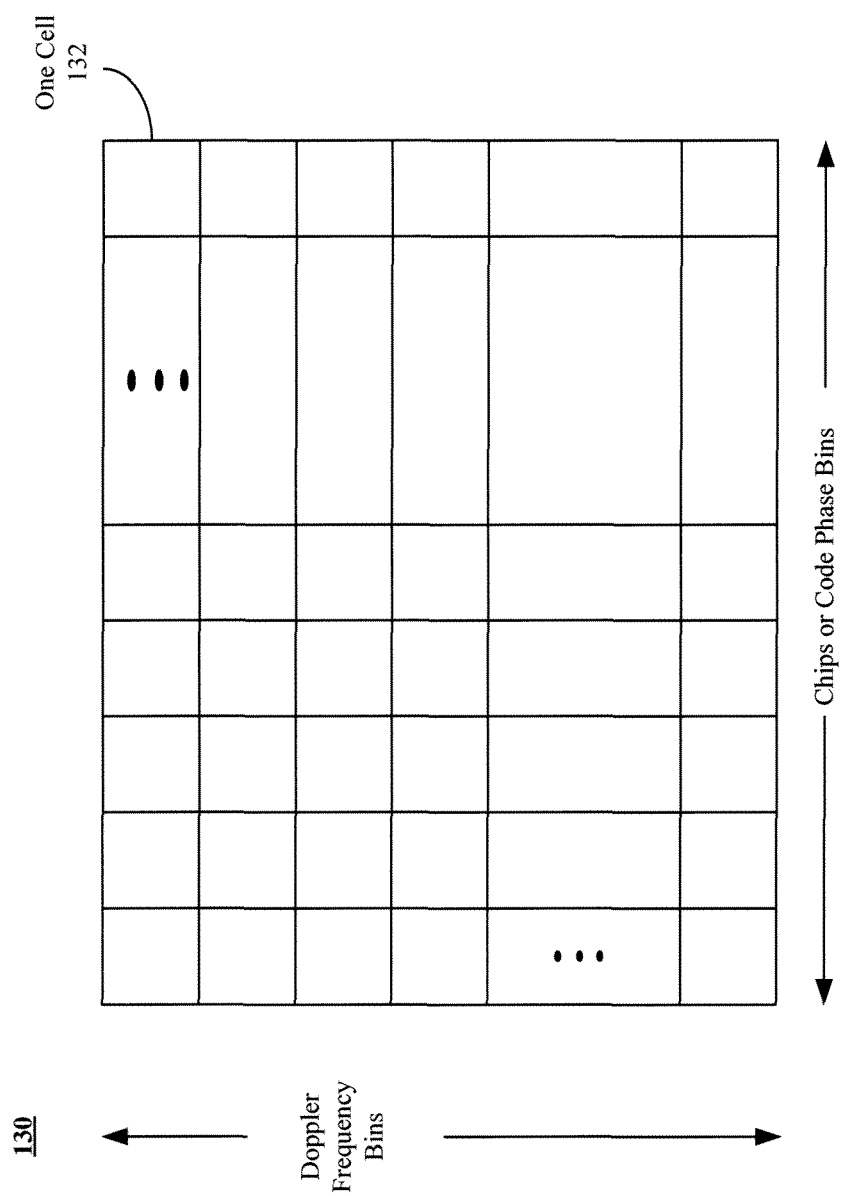
FIG. 2 is an exemplary diagram of a search space used in acquiring a satellite signal.

The acquisition phase searches in a code phase/Doppler frequency search space. FIG. 2 is an illustration of an exemplary code phase/Doppler frequency search space 130. The search space 130 may be viewed as a two-dimensional grid of cells or search points, where each cell 132 represents a particular Doppler frequency bin and code phase or chip. When the search space is for a GPS signal, there may be eight Doppler frequency bins and 2046 code phase bins, where each code phase bin is in ½ chip increments.

The time spent in each cell is referred to as the dwell time. Dwell times may vary from less than 1 ms for a strong signal to 10 ms for a weak signal. For each cell, the search engine correlates the received signal with a generated code associated with the cell's code phase and Doppler frequency. Correlation is a measurement of the similarity (i.e similarity measurement) of the received signal with the generated code and the correlation result indicates the degree of the similarity. If the correlation result (i.e., similarity measurement) exceeds a predetermined threshold, then the signal is despread and a carrier signal is recovered. If the correlation result (e.g. peak-to-average-power ratio) does not exceed the predetermined threshold, the search for the signal continues in the next code phase bin. Attention now turns to a more detailed description of the search engine.

Figure 3:
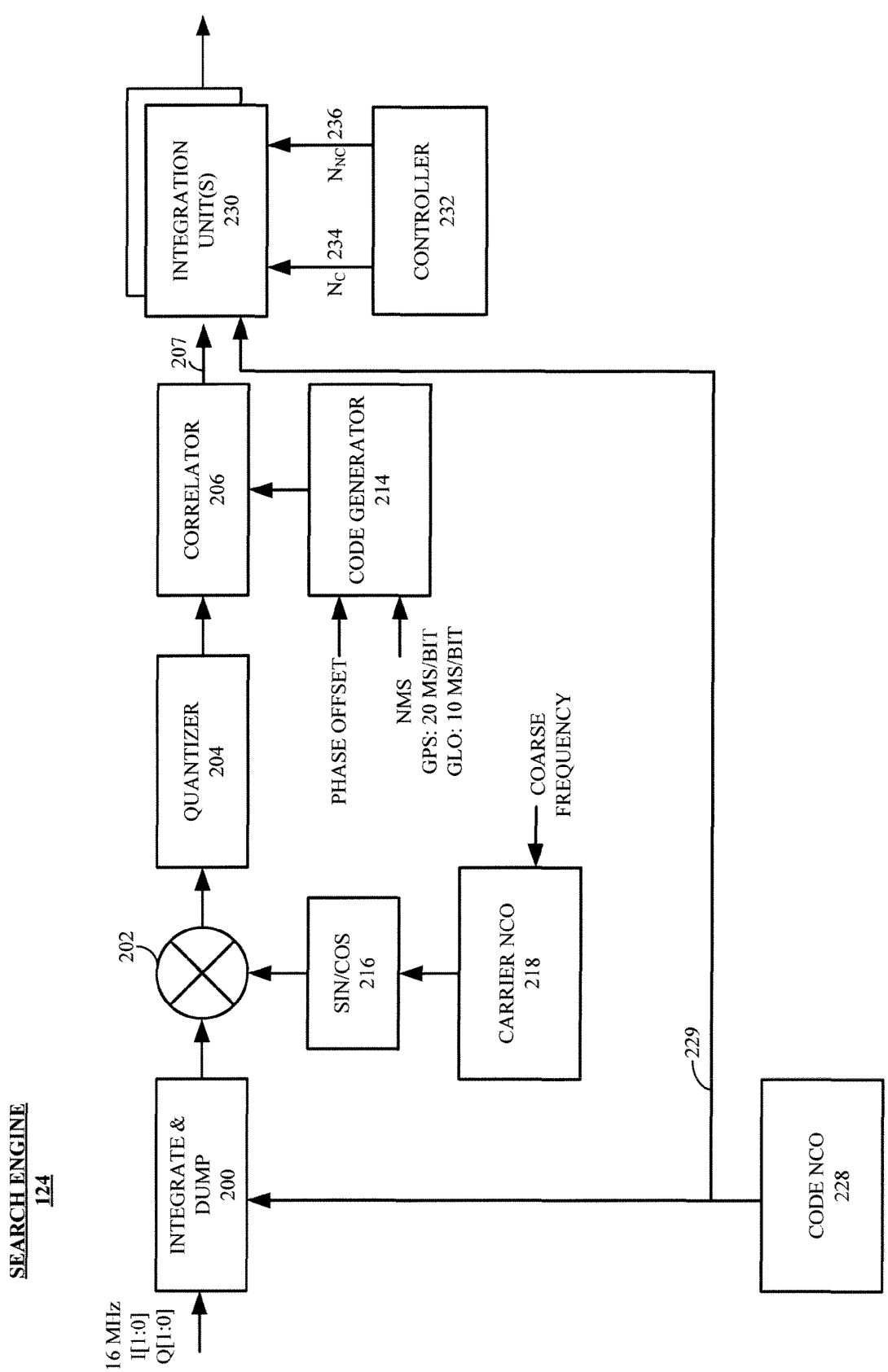
FIG. 3 is an exemplary block diagram of a search engine.

FIG. 3 illustrates the components of an exemplary search engine 124. The search engine 124 is a dedicated acquisition unit which may be used to locate a particular satellite signal and its properties, particularly the code phase. A user configures the search engine with an estimated carrier frequency, PRN or PN code, and code frequency for the desired satellite signal. The search engine 124 may search for either a GPS or GLONASS signal. At the end of the search sequence, the code phase and the frequency values for the satellite signal may be verified and then forwarded to a tracking engine.

In an embodiment, the search engine 124 may include an integrate and dump (I&D) unit 200, a mixer 202, a quantizer 204, a correlator 206, a code generator 214, and one or more integration units 230, all coupled in series. The search engine 124 may further include a controller 232 that provides user-defined inputs, $N_C$ 234, and $N_{NC}$ 236, to the integration units 230.

The I&D unit 200 receives a data stream or I and Q sample values at a rate of 16.67 Mhz. The sample values are integrated to an accumulator at a chip rate. At the preferred chip rate, the accumulator contents are output and the accumulator is cleared (i.e., dumped). The dumping occurs at either the ½ or ¼ chip rate. The chip rate frequency is generated by a code numerically controlled oscillator (NCO) 228 coupled to I&D unit 200.

The output sampling rate for a GLONASS signal is half the output sample rate for a GPS signal. For example, for ½ chip resolution, the output sampling rate is 2 MHz for a GPS signal and is 1 MHz for a GLONASS signal. For ¼ chip resolution, the output sampling rate is 4 MHz for a GPS signal and 2 MHz for a GLONASS signal.

The I and Q signals are then mixed with a coarse carrier frequency in order to implement coarse carrier removal. A carrier numerically controlled oscillator (NCO) provides its output to sine/cosine table 216 which in turn provides its output to mixer 202. The mixer 202 mixes I and Q signals with the coarse carrier frequency to produce a signal with the carrier of the NCO frequency removed by shifting it into zero frequency. The output of mixer 202 is multiple bits long and is fed to quantizer 204 to quantize the I and Q signals to 2 bits.

The quantized I and Q signals may then be correlated with a reference C/A code sequence. The C/A code sequence may be generated by code generator 214 for either a GPS or GLONASS signal. The C/A code sequence for GLONASS is 511 chips and the C/A code sequence for GPS is 1023 chips. Correlator 206 correlates I and Q signals with the appropriate C/A code sequence which is forwarded to a respective integration unit 230.

In an embodiment, correlator 206 may be implemented using a shift register delay line, which compares its stored bits to the C/A code bits received from code generator 214. Code generator 214 receives a phase offset as well as a navigation message sequencer (NMS). In an embodiment, correlator 206 may provide a correlated result every 1 ms.

Figure 4:
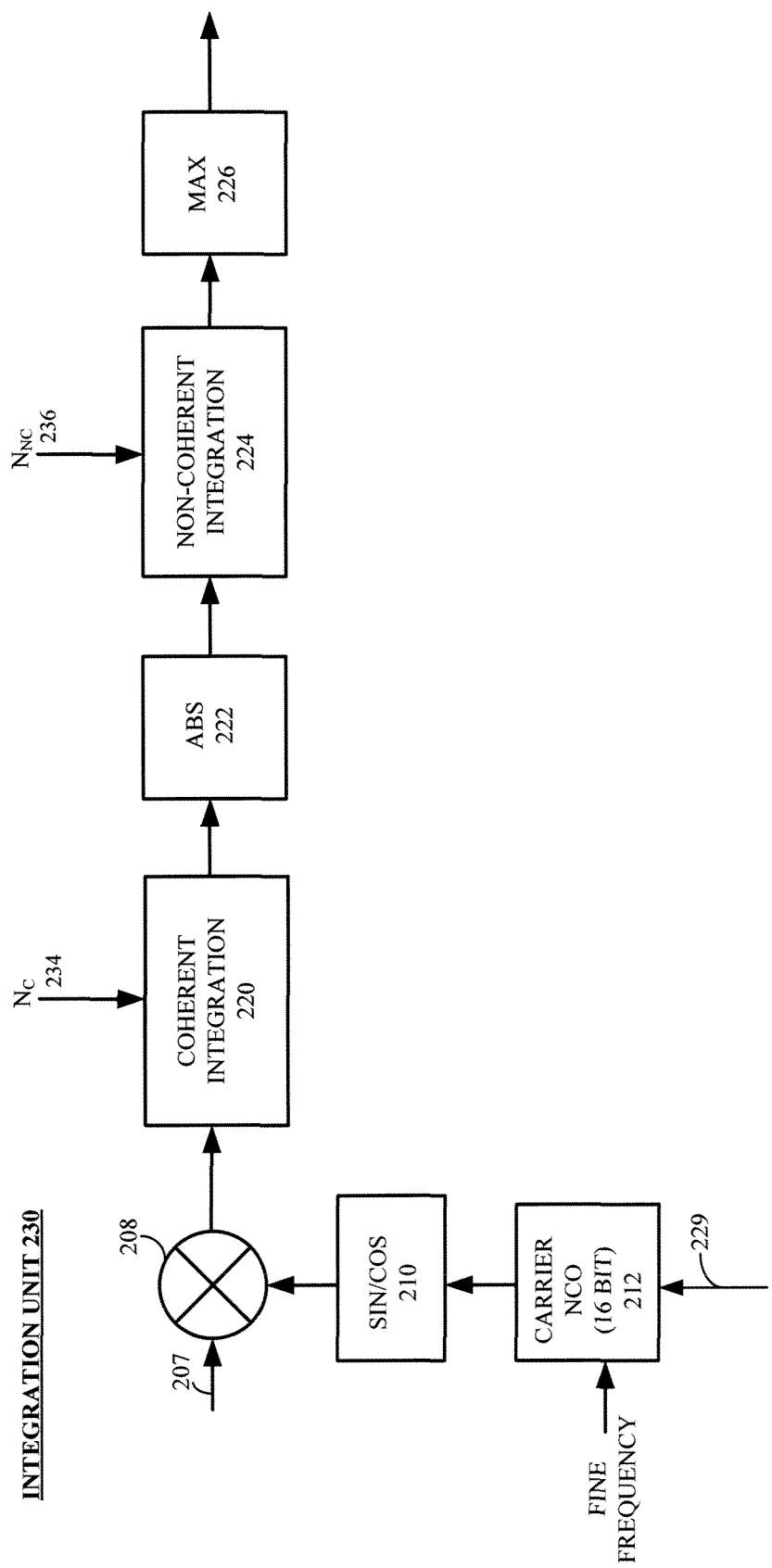
FIG. 4 is an exemplary block diagram of an integration unit.

FIG. 4 illustrates the components of an exemplary integration unit 230. In an embodiment, the search engine 124 may utilize eight integration units 230, one for each Doppler frequency bin in a search space 130.

Each integration unit 230 may include a mixer 208, a coherent integration block 220, an absolute value block 222, a non-coherent integration block 224, and a MAX block 226 (which provides an output of search engine 124), all coupled in series. The integration unit mixer 208 together with the fine carrier NCO implements fine carrier removal from the I and Q signals 207. The fine carrier NCO 212 is controlled by the code NCO 228 (FIG. 3) through output 229 and provides its output to sine/cosine table 210 which in turn provides its output to mixer 208. The mixer 208 mixes the I and Q signals with the fine carrier frequency to produce a signal with the carrier of the NCO frequency removed.

The coherent integration unit 220 sums the correlation values over a sampling period, such as 1 ms, generating an in-phase integration value, $S_I$, and a quadrature-phase integration value, $S_Q$, where $$S_I = \sum_{k=1}^{Nc} I_k, S_Q = \sum_{k=1}^{Nc} Q_k,$$

and where $N_C$, 234, is the coherent time (e.g., 1 ms). The absolute values of the in-phase integration value and the quadrature-phase integration value is then determined by ABS unit 222, $\sqrt{S_I^2+S_Q^2}$, which is used by the non-coherent integration 224 to determine the non-coherent integration value, $S_{NC}$, where $$S_{NC} = \sum_{i=1}^{Nnc} \sqrt{S_I^2 + S_Q^2},$$

and $N_{NC}$, 236, is the number of non-coherent summations. The values of $N_C$, 234, and $N_{NC}$, 236, are set by controller 232 and may be user-defined variables. The value of $N_{NC}$ may be selected to achieve a particular performance factor.

Non-coherent integration may be performed after coherent integration to detect weak signals. In non-coherent integration, the absolute correlation values of the coherent integration are added. The dwell time is the product of the coherent time and the number of non-coherent integration iterations. In order to minimize the dwell time and the overall acquisition time, it is desirable to minimize the number of non-coherent integration iterations that are performed.

At certain intermediate points in the non-coherent integration iteration, checks or tests may be made to determine whether or not the search in the current bin may result in a match. The tests may be made at one or more intermediate points in the non-coherent integration. In an embodiment, two tests may be made at each intermediate point. One test is used to determine whether a match is not likely and the other test determines whether a match is likely. In an embodiment, the tests may be implemented as a comparison of the peak-to-average-power ratio (PAPR) of the correlation summation output to a predetermined threshold. The PAPR may be the ratio of the maximum correlation output over the average correlation output, where the maximum correlation output is the last value of $S_{NC}$ at the last iteration of the non-coherent summation at the intermediate point, and the average correlation output is the average overall non-coherent summations at the intermediate point. The PAPR is used to determine whether or not to terminate the non-coherent summation iterations and proceed to the next code phase bin.

The first test is made to determine if a match is not probable at the intermediate point. This test checks if the PAPR exceeds a first PAPR threshold. The first PAPR threshold is used to indicate that the search in the current code phase bin is not likely to produce a correlation peak. There may be several first PAPR thresholds where each first PAPR threshold is associated with a particular intermediate point. The first PAPR threshold may be set to achieve an intended detection rate and/or miss detection rate. A detection rate pertains to the rate or occurrence of detecting a satellite signal rather than noise and the miss detection rate pertains to the rate or occurrence of falsely dismissing a satellite signal.

The second test is made to determine whether or not at an intermediate point, a match is likely. For instance, a strong signal may be detected in which case there is no need to complete the entire non-coherent integration. The non-coherent integration is used to detect weak signals and as such, the search parameters, such as the coherent time, frequency bin size, and the number of non-coherent integration iterations, are configured to perform the non-coherent integrations over a longer number of iterations which may not be necessary for a stronger signal.

The second PAPR threshold may be set to achieve a shorter detection time and false alarm rate. There may be several PAPR thresholds where each PAPR threshold is associated with a particular intermediate point. A detection time is the time it takes to detect a satellite rather than noise and the false alarm rate pertains to the rate of falsely detecting a satellite signal. For example, assume the case where the search parameters are set as follows: (1) the coherent time, $N_C$=11 ms; (2) a frequency bin size of 76 Hz; (3) the number of non-coherent integrations, $N_{NC}$=171; and (4) the intermediate points are set at iterations 4, 11, 43, and 86. Based on these search parameters, the second PAPR threshold may be set as 3.064, 2.019, 1.516, 1.364 and 1.156 respectively resulting in a 95% detection rate when the required signal strength at each intermediate point is −136, 140, −144, −146, and −149 dBm (power ratio in decibels referenced to one milliwatt) respectively. The second PAPR threshold values are selected to achieve a false alarm rate of 1e-7 for each single frequency bin in a 1023 search space.

At the end of the non-correlation integration, a third check is made to determine if after the completion of all the non-correlation integration iterations, whether or not there was a match. If a match is detected, the signal is verified and the search continues to the next coarse bin.

Although the integration unit 230 shown in FIG. 2 has a limited number of elements in a certain configuration, it should be appreciated that the integration unit 230 may include more or less elements in alternate configurations. In some embodiments, the integration unit is implemented in software as part of a logic device, controller, state machine or the like having a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on.

Attention now turns to exemplary methods describing the operation of the search engine. It should be noted that these methods may be executed in another order, unless otherwise indicated, and may be executed in serial, parallel, or in any combination of serial and/or parallel operations. The methods may be implemented in hardware components, as executable instructions as firmware in a logic device, as instructions in a state machine, or in any combination thereof.

Figure 5:
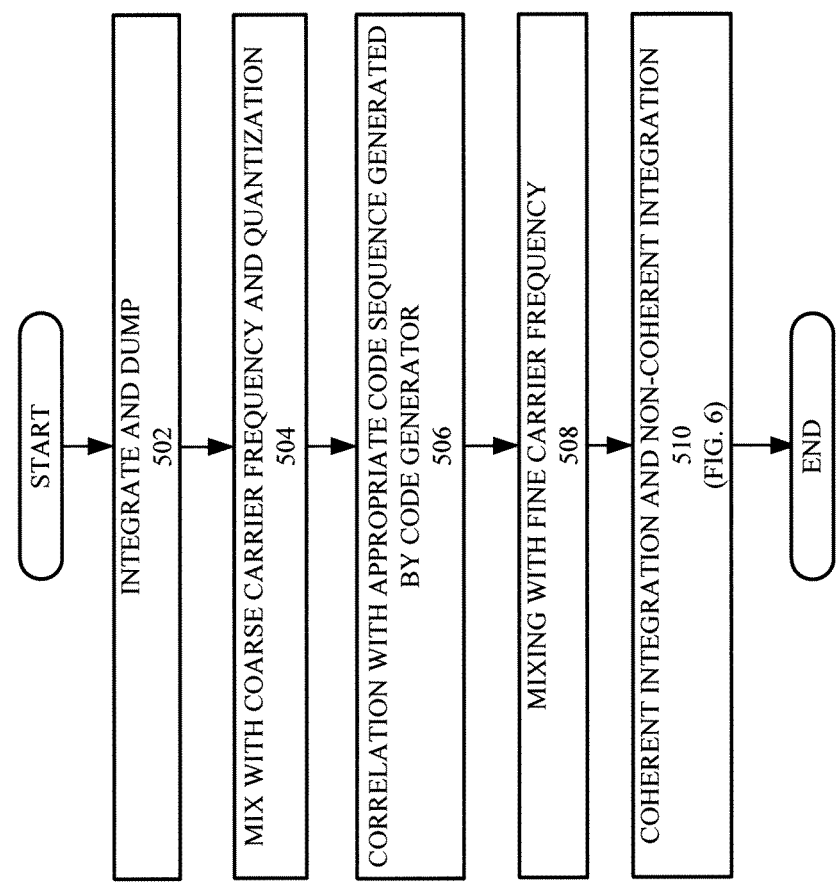
FIG. 5 is an exemplary flow chart illustrating a process for use in the search engine.

FIG. 5 illustrates an exemplary method of the search engine. The search engine is configured to search for the identity of a satellite. During a sampling period, the I and Q signals are integrated and dumped (block 502). The I and Q signals are mixed with a coarse carrier frequency to eliminate that frequency and then quantized into two-bit signals (block 504). The I and Q signals are correlated with the appropriate PRN or PN code sequence for the specific satellite (block 506) and then mixed with a fine carrier frequency (block 508). The coherent and non-coherent integrations compute the envelope $$\sum_{i=1}^{Nnc} \sqrt{S_I^2 + S_Q^2},$$

which is compared to a threshold to determine the presence or absence of a correlation peak indicating a match of a satellite signal (block 510).

Figure 6:
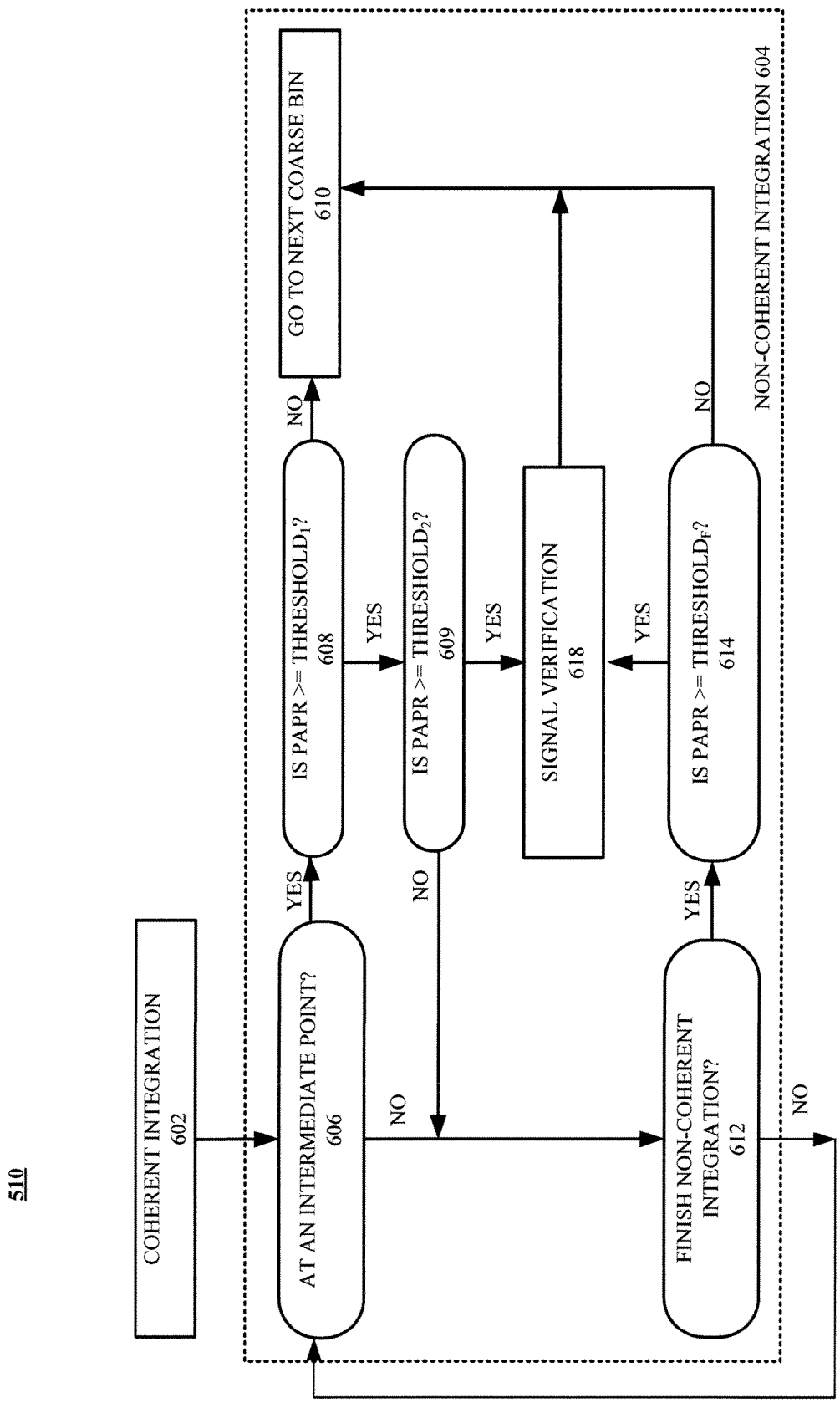
FIG. 6 is an exemplary flow chart illustrating a process for use in the integration unit.

Turning to FIG. 6, coherent integration is performed by accumulating the I and Q signals during the time period set forth in $N_C$ and then generating an in-phase integration value, $S_I$, and a quadrature-phase integration value, $S_Q$, where $$S_I = \sum_{k=1}^{Nc} I_k,$$

and $$S_Q = \sum_{k=1}^{Nc} Q_k$$

(block 602). The next step is the non-coherent integration (block 604) which is composed of various operations (blocks 606-618).

At one of the intermediate points in the non-coherent integration (block 606), the PAPR is calculated and compared against a first PAPR threshold (i.e., threshold$_1$) (block 608). If the PAPR does not equal or exceed the first PAPR threshold (block 608—No), then the search at the current cell terminates and the search resumes at the next coarse bin (step 610). If the PAPR is equal to or exceeds the first PAPR threshold (block 608—Yes), then the PAPR is compared against a second PAPR threshold (i.e. threshold$_2$)(block 609). If the PAPR is equal to or exceeds the second PAPR threshold (block 609—Yes), then the search at the current cell terminates, the signal is verified (block 618), and the search continues to the next coarse bin (block 610).

If the PAPR is less than the second PAPR threshold or if not at an intermediate point in the non-coherent integration (block 609—No or block 606—No), then a check is made to determine if a predetermined number of non-coherent integration iterations, $N_{NC}$, have been performed (block 612). If the predetermined number of non-coherent integration iterations, $N_{NC}$, have been performed (block 612—Yes), then the PAPR is calculated and compared against a final threshold (i.e., threshold$_F$) (block 614). If the PAPR does not exceed the final threshold (block 614—No), then the search at the current cell terminates and the search resumes at the next code phase bin (step 610). Otherwise, if the PAPR exceeds the final threshold (block 614—Yes), the signal is verified (block 618) and the search continues to the next coarse bin (block 610). If the number of non-coherent integrations have not been performed (block 612—No), the process iterates again.

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Although the exemplary receiver is described with respect to an architecture containing components that may process both GPS and GLONASS signals, the technology embodied herein is not constrained to any one particular satellite signal and may be employed in a single mode satellite receiver and utilizing a different combination of satellite signals from any satellite system.

Various embodiments may be implemented using hardware components, software components, or any combination thereof. Examples of such hardware components may include devices, components, processors, microprocessors, circuits, circuit elements, integrated circuits, application specific integrated circuits, programmable logic devices, digital signal processors, field programmable gate arrays, memory units, logic gates and so forth. Examples of the software components may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

What is claimed:

1. A method for acquiring a satellite signal in a satellite receiver, the method comprising:
   sampling data received by the satellite receiver during a plurality of sampling periods;
   performing coherent integration to accumulate the sampled data over each of the plurality of sampling periods;
   performing non-coherent integration based on the accumulated sampled data from the coherent integration, thereby providing a correlation output, wherein the non-coherent integration is performed for a plurality of iterations, including one or more intermediate iterations;
   determining a peak-to-average power ratio (PAPR) based on the correlation output at a first one of the one or more intermediate iterations; and
   determining whether to continue sampling data received by the satellite receiver by comparing the PAPR to a first predetermined threshold.

2. The method of claim 1, further comprising:
   determining to continue sampling data received by the satellite receiver when the PAPR meets the first predetermined threshold.

3. The method of claim 2, further comprising:
   determining to continue sampling data received by the satellite receiver when the PAPR does not exceed a second predetermined threshold.

4. The method of claim 2, further comprising:
   terminating sampling data received by the satellite receiver when the PAPR exceeds both the first predetermined threshold and a second predetermined threshold.

5. The method of claim 1, further comprising:
   terminating sampling data received by the satellite receiver when the PAPR does not meet the first predetermined threshold.

6. The method of claim 1, wherein the first predetermined threshold is set to provide a false alarm rate and a detection rate for correctly detecting the satellite signal.

7. The method of claim 1, further comprising:
   determining a second PAPR based on the correlation output at a second one of the one or more intermediate iterations; and
   determining whether to continue sampling data received by the satellite receiver by comparing the second PAPR to a second predetermined threshold.

8. The method of claim 1, wherein the satellite receiver accepts a GPS and a GLONASS satellite signal.

9. An apparatus for acquiring a satellite signal, comprising:
   a plurality of integration units, each integration unit associated with a search space having a plurality of cells, each cell associated with a Doppler frequency bin and a code phase bin, each integration unit receiving a known code phase to search for in each cell, each integration unit having:
      a coherent integration unit configured to accumulate sampled data received from the satellite signal, during a plurality of sampling periods; and
      a non-coherent integration unit, coupled to the coherent integration unit, configured to perform non-coherent integration on the accumulated sampled data from the coherent integration unit for a predetermined number of iterations;
   wherein each integration unit is configured to compare a peak-to-average power ratio at one or more intermediate iterations of the predetermined number of iterations to at least one threshold.

10. The apparatus of claim 9, wherein each integration unit operates concurrently within a particular Doppler frequency bin in the search space.

11. The apparatus of claim 9, wherein each integration unit is further configured to terminate performing non-coherent integration before the predetermined number of iterations have been made when the peak-to-average power ratio does not exceed a first predetermined threshold at an intermediate iteration of the one or more intermediate iterations.

12. The apparatus of claim 11, wherein each integration unit is further configured to terminate performing non-coherent integration before the predetermined number of iterations have been made when the peak-to-average power ratio exceeds a second predetermined threshold at an intermediate iteration of the one or more intermediate iterations.

13. The apparatus of claim 9, wherein each integration unit is further configured to compare the peak-to-average power ratio after completion of the predetermined number of iterations to a final predetermined threshold in order to determine an outcome in the search of a cell.

14. The apparatus of claim 9, wherein each integration unit is configured to search for a GPS satellite signal in a first configuration and a GLONASS satellite signal in a second configuration.

15. A method for acquiring a satellite signal, the method comprising:
   receiving data from the satellite signal, the data associated with a code phase bin and Doppler frequency bin;
   correlating the received data with a known code phase for a number of iterations, thereby providing correlated results;
   performing coherent integration based on the correlated results over a plurality of sampling periods;
   performing non-coherent integration based on results of the coherent integration, thereby providing a correlation output, wherein the non-coherent integration is scheduled to be performed for a plurality of iterations, including one or more intermediate iterations;
determining at a first one of the one or more intermediate iterations, whether the correlation output is not likely to match the received data to the known code phase; and
terminating at the first one of the one or more intermediate iterations, the correlation of the received data with the known code phase.

16. A method for acquiring a satellite signal, the method comprising:
receiving data from the satellite signal, the data associated with a code phase bin and Doppler frequency bin;
correlating the received data with a known code phase for a number of iterations, thereby providing correlated results;
performing coherent integration based on the correlated results over a plurality of sampling periods;
performing non-coherent integration based on results of the coherent integration, thereby providing a correlation output, wherein the non-coherent integration is scheduled to be performed for a plurality of iterations, including one or more intermediate iterations;
determining at a first one of the one or more intermediate iterations, whether the correlation output is not likely to match the received data to the known code phase;
determining at a second one of the one or more intermediate iterations, before the scheduled plurality of iterations has been completed, whether the correlation output is likely to indicate a match of the received data to the known code phase; and
terminating at the second one of the one or more intermediate iterations, the correlation of the received data with the known code phase.

* * * * *